(12) United States Patent
Goldberg (10) Patent No.: US 7,093,193 B1
(45) Date of Patent: Aug. 15, 2006

(54) STRING TEMPLATE PAGES FOR GENERATING HTML DOCUMENT

(75) Inventor: Matthew A. Goldberg, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1109 days.

(21) Appl. No.: 09/699,962

(22) Filed: Oct. 30, 2000

(51) Int. Cl.
*G06F 17/00* (2006.01)

(52) U.S. Cl. .................................... 715/513
(58) Field of Classification Search ................ 715/540, 715/513, 501.1; 709/203; 707/10; 717/100; 705/26

See application file for complete search history.

(56) References Cited

U.S. PATENT DOCUMENTS

| | | | |
|---|---|---|---|
| 5,267,155 A * | 11/1993 | Buchanan et al. | 715/540 |
| 5,835,712 A | 11/1998 | DuFresne | |
| 5,987,480 A | 11/1999 | Donohue et al. | |
| 6,073,143 A | 6/2000 | Nishikawa et al. | |
| 6,101,509 A | 8/2000 | Hanson et al. | |
| 6,247,174 B1 * | 6/2001 | Santhanam et al. | 717/154 |
| 6,484,149 B1 * | 11/2002 | Jammes et al. | 705/26 |
| 6,643,652 B1 * | 11/2003 | Helgeson et al. | 707/10 |
| 6,772,408 B1 * | 8/2004 | Velonis et al. | 717/100 |
| 6,826,594 B1 * | 11/2004 | Pettersen | 709/203 |

OTHER PUBLICATIONS

Moreno, C.; "HTML Document Templates for CGI Applications", *C/C++ Users Journal*, vol. 18, No. 9, Sep. 2000, p. 10, 12, 14-16, 18, 20-22, 24-25.

Tang, W., et al.; "Intelligent Browser Initiated Server Pushing", *Conference Proceedings of the 2000 IEEE International Performance, Computing, and Communications Conference*, 2000, p. 17-23.

Gwertzman, J.S., et al.; "The Case for Geographical Push-Caching", *Proceedings of the 5th Workshop on Hot topics in Operating Systems*, 1995, p. 51-55.

* cited by examiner

*Primary Examiner*—Sanjiv Shah
(74) *Attorney, Agent, or Firm*—Amin & Turocy, LLP (57) ABSTRACT

A system and method is provided for generating dynamically changing HTML documents at a relatively quick rate in response to a client request. The system and method provide separation of the constant text and the code embedded in the HTML documents. An executable component is employed that includes all the basic functionality typically embedded in script code of a plurality of HTML documents. The dynamically generated text is broken down into string template pages. Each string template page can be authored as a single file and includes all the information necessary to complete a request. A string template page includes one or more strings and each string is made up of a text constant and can include one or more argument variables. Each string template page is provided with identifiers for pages, text constants and variable portions of strings. The pages are read, parsed and processed into a data structure into memory by the executable component for efficient use at runtime.

16 Claims, 6 Drawing Sheets

```
<?HTML version = "1.0"?>
<HTML>
<BREAK GUID1>              ← 72
        HTML HEADER
<BREAK>
                           ← 74
<BREAK GUID2>
        HTML STRING <INSERT ARG1><INSERT ARG2>
<BREAK>

<BREAK GUID3>      ← 76
        HTML STRING
<BREAK>
                   ← 78
<BREAK GUID4>
        HTML STRING <INSERT ARG3>
<BREAK>
<HTML>
```

Fig. 3

```
PAGEID pgidTest = {"Test.htm", NULL};
STRID stridGuid1 = {"Header", NULL};
STRID stridGuid2 = {"Guid2", NULL};
STRID stridGuid3 = {"Guid3", NULL};
STRID stridGuid4 = {"Guid4", NULL};
ARGNO argnoArg1 = {"Arg1", NULL};
ARGNO argnoArg2 = {"Arg2", NULL};
ARGNO argnoArg3 = {"Arg3", NULL};
```

Fig. 4

```
pgidTest = {"Test.htm", Pointer1};
stridGuid1 = {"Header", Pointer2};
stridGuid2 = {"Guid2", Pointer3};
stridGuid3 = {"Guid3", Pointer4};
stridGuid4 = {"Guid4", Pointer5};
argnoArg1 = {"Arg1", Pointer6};
argnoArg2 = {"Arg2", Pointer7};
argnoArg3 = {"Arg3", Pointer8};
```

STRING TEMPLATE PAGES FOR GENERATING HTML DOCUMENT

TECHNICAL FIELD

The present invention relates to computer systems, and more particularly to a system and method for supply requested documents at a relatively quick rate.

BACKGROUND OF THE INVENTION

Web documents are stored on web servers and are provided to client computers over the Internet upon receipt at the web server of a request for the document in the form of a uniform or universal resource locator ("URL"). The URL specifies the communications protocol by which the information is to be transferred and the Internet address of the host or web server upon which the document is stored. The URL may also specify a directory path and file name for the document. The communications protocol for the web is the hypertext transfer protocol ("HTTP"). Documents or pages stored on web servers and available over the web are generally formatted in a markup language. Markup language web documents contain text and a number of tags which provide instructions as to how the text should be displayed, which text should be hyperlinked to other documents, and where other types of content, including graphics and other images, video and audio segments, application programs or applets, image maps, and icons, should be retrieved from and displayed in the document. One of the most commonly used standardized markup languages is the Hypertext Markup Language ("HTML"), currently available in several versions. Other standardized markup languages include the Standard Generalized Markup Language ("SGML") and the Extensible Markup Language ("XML").

Conventionally, web servers receive requests from a client for a particular HTML document. The servers then load the HTML file (e.g., an Application Service Provider (ASP) file) and parse the HTML file for script code. The script code is then interpreted and executed and the results sent back to the requestor, for example, by inserting the results into the loaded HTML file and transmitting the file and results back to the requestor. The problem is that the process of parsing, interpreting and executing the code is both time and resource intensive.

In order for a web server to serve many users at a reasonable rate, the web server must be able to supply the requested HTML pages very quickly and use as little system resources as possible. Web sites that dynamically generate web pages based on state and user input have the challenge of doing this in a scalable manner. The most efficient way to do so is through compiled code running in the same process as the web server. The most obvious place is for the HTML text to be part of the code itself, but this leads to disconnected, hard to read string constants that are difficult to maintain and that require a recompilation of the code whenever a change is made to the HTML text.

Accordingly, there is an unmet need in the art for a system and method that mitigates the above stated deficiencies with traditional HTML servers.

SUMMARY OF THE INVENTION

A system and method is provided for supplying requested HTML pages at a relatively quick rate using limited resources. The present invention provides a solution to efficiently, clearly, and straightforwardly supplying text constants to code running in a server environment and using them to generate dynamically changing pages. The present invention employs an executable code component residing on a server system that inserts text templates including strings and arguments into requested HTML documents. The text strings general includes constant parts and variable parts. Variable parts change depending on state and user input. Each text template is considered a page and is loaded up at start up time by the executable code component, which parses and stores the constant parts of the text string into memory and retains the memory location of the text string. Additionally, the memory location of argument variables within the text constants can also be stored in memory. A request from a client causes the executable code component to load a copy of the appropriate HTML page, retrieve the appropriated text strings and arguments from the memory and insert the text strings and appropriate arguments into the loaded page. The copy is then transmitted back to the client. The executable code can also execute any code that was required by the HTML page to provide the desired results.

In one aspect of the invention, the constant part of the text strings residing in the templates can be modified without recompiling the code. Modifications to the templates can be made while the executable code is still running. At the point when the executable code component loads a text template, it begins monitoring the text template for any changes made while running. Upon a change occurring, the text template is loaded and parsed again and the old information is replaced by the new information. Code referencing that page is automatically provided with the new information, thus, modifications occur dynamically.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. The present invention is described with reference to a system and method for generating dynamically changing HTML documents at a relatively quick rate in response to a client request. The system and method provide separation of the constant text and the code embedded in the HTML documents. The present invention employs an executable component that includes all the basic functionality typically embedded in script code of a plurality of HTML documents. The dynamically generated text is broken down into string template pages. Each string template page can be authored as a single file and includes all the information necessary to complete a request. Editing the file can be done with the author's favorite document editing tool, and likewise viewing the file can be done in the typical manner as well, as long as meta-information in the page is included in a format that is considered "hidden" by the viewer.

A string template page includes one or more strings and each string includes a text constant and can include one or more argument variables. Each string template page is provided with identifiers for pages (e.g., the file name), string or text constants (e.g., text that does not change) and variable portions of strings (e.g., arguments). The pages are read, parsed and processed into a data structure into memory by the executable component for efficient use at runtime. The executable component parses each page for where each string begins and ends and the strings unique identifier and where each argument should be inserted into the string constant and its argument number.

The present invention provides for separation of the text constants of HTML documents from the code embedded in the HTML documents. By separating the text constants out into individual files, including the minimal meta-information needed by the code to use them, readability, ease of authoring, and separation of text data and code are achieved. The needs of generating dynamic text can be served by breaking up the text into pages, strings, and places to insert arguments. To make the use of these templates at runtime as fast as possible, the files are pre-processed at start-up time, efficiently storing information about where the pages and strings are located, with particular details about where they begin and end, and where to insert arguments. Intelligent IDs can take advantage of this efficiency, by allowing the code to reference objects by one ID only, defined at design time, while still gaining the direct access provided by pointers determined at run time.

Figure 1:
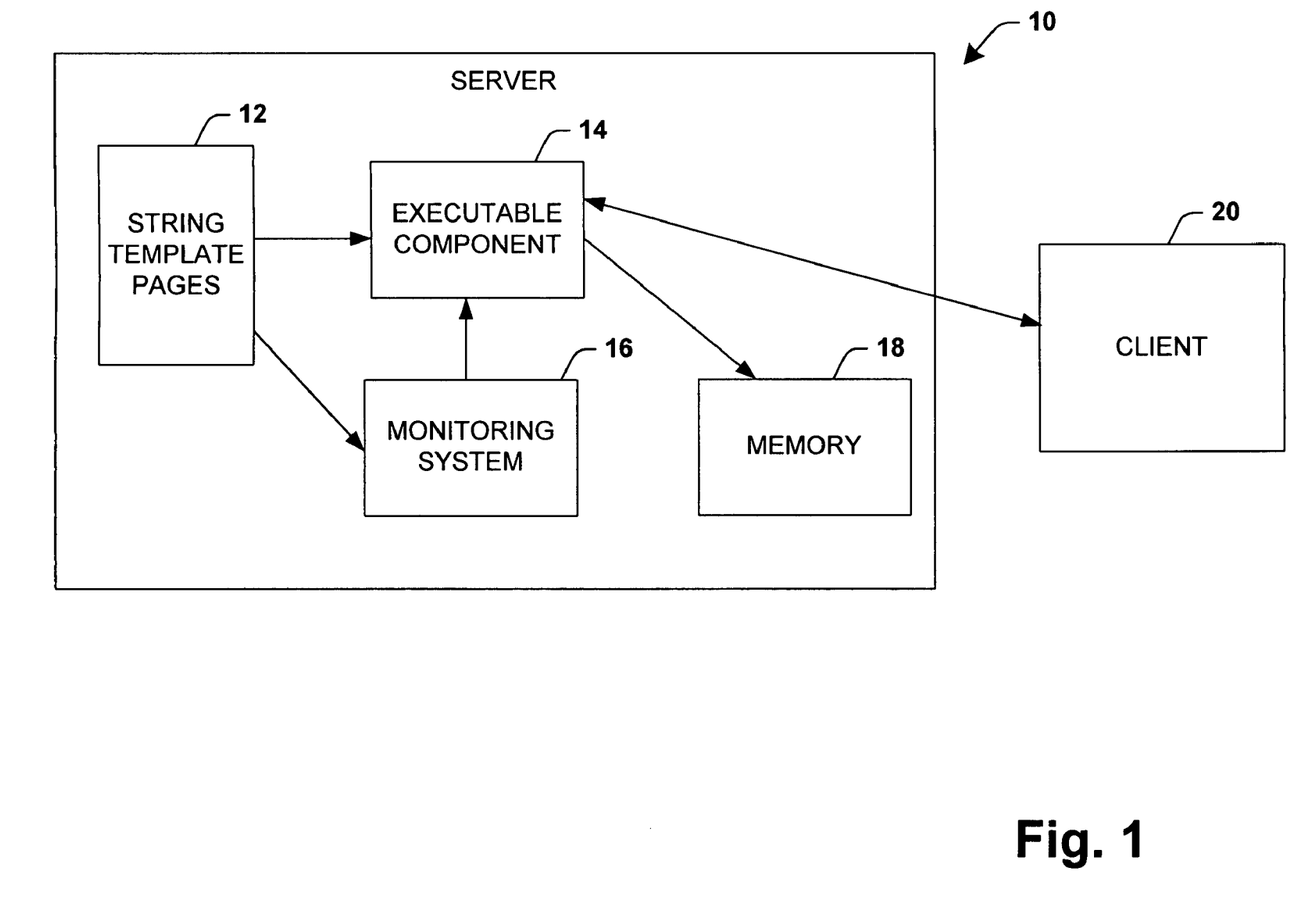
FIG. 1 illustrates a block diagram of a server system in accordance with one aspect of the present invention.

FIG. 1 illustrates an example of a server system 10 for supplying requested HTML pages to a client system 20 according to the present invention. An executable component 14, for example, an executable binary component resides on the server 10. The executable component 14 is operable to load and parse a plurality of string template pages 12. The executable component parses string constants from the string template pages 12 by utilizing new string indicators provided in the pages and determines where variables are to be inserted by utilizing an insert argument indicator provided in the strings. The executable component 14 stores the string constants into a memory 18 and retains information relating to the memory location of each string constant and the insertion location of each variable. The executable component 14 also includes all the code necessary to respond to any request that may be made by the client 20. The executable component 14 also includes all the logic necessary regarding where and when strings should be used, whether or not and how often a string should be repeated.

The executable component 14 parses string constants from the string template pages 12 by utilizing new string indicators and determines where variables are to be inserted by utilizing insert argument indicators. The executable component 14 stores the string constants into a memory 18 and retains information relating to the memory location of each string constant and the insertion location of each variable. All the logic necessary to generate and insert the variable arguments into the string constants resides in the executable component. A variable can be a pointer to text, for example the user's name, or the current date, generated by the code. A variable can also be a pointer to another string in the page, for example, if there is an optional text constant which may or may not be used depending on a state. The argument can be authored as a string in the page and passed in as a variable only when applicable.

A monitoring system 16 is provided coupled to the executable component 14. The monitoring system 16 monitors any changes to the string template pages 12. If any changes occur with any of the string template pages 12, the monitoring system 16 informs the executable component 14. The executable component 14 then reloads the changed string template page or pages, parses the string constants and variable locations, stores the new string constants in memory and retains the string constant and variable locations. The monitoring system 16 could be a configuration data source component, for example, in the Microsoft® Windows® Operating System environment, the configuration data source component type could be Windows Management Instrumentation (WMI), which is a support mechanism for management of systems in an enterprise. WMI allows developers to use a simple, consistent mechanism to query for information or configure settings on computers across an enterprise (e.g., hardware settings, file change information, driver configuration, BIOS information, application settings, event log information). WMI allows for both hardware and software to be modeled. It is to be appreciated that other computer monitoring systems that provide configuration information may be employed to carry out the present invention.

The monitoring system 16 allows modification to the string template pages 12 while the executable component 14 is running. With the constant part of the text residing in the templates, completely separate from the code, changes can be made to the constant text without needing to recompile the code. After the code initially loads a string template page, the monitoring system 16 or the executable component 14 can begin monitoring that page or file for any changes made while running. When a change occurs, the page is loaded and parsed again, and the new information replaces the old. Code that references that page will now be given information about the new parse, such that modifications can be incorporated on the fly.

A request for a HTML document from a client 20 is received by the executable component 14. The executable component 14 executes any code relating to the request. The executable component 14 then loads up the string constants for a particular string template page 12 corresponding to the request using pointers pointing to the memory locations of the strings in the memory 18. The executable component 14 then retrieves the argument numbers, determines the appropriate variable based on the request or a state and inserts the variable into the strings. The executable component 14 then returns the results of any executed code and the string constants with inserted variables therein. It is to be appreciated that the request that the executable component may insert the strings and arguments into a requested HTML page in place of the results that were conventionally provided by script. Alternatively, the executable component 14 via the code and the stored information of the string template pages 12 may serve up the entire HTML page and results requested without the need to load up any HTML page.

Figure 2:
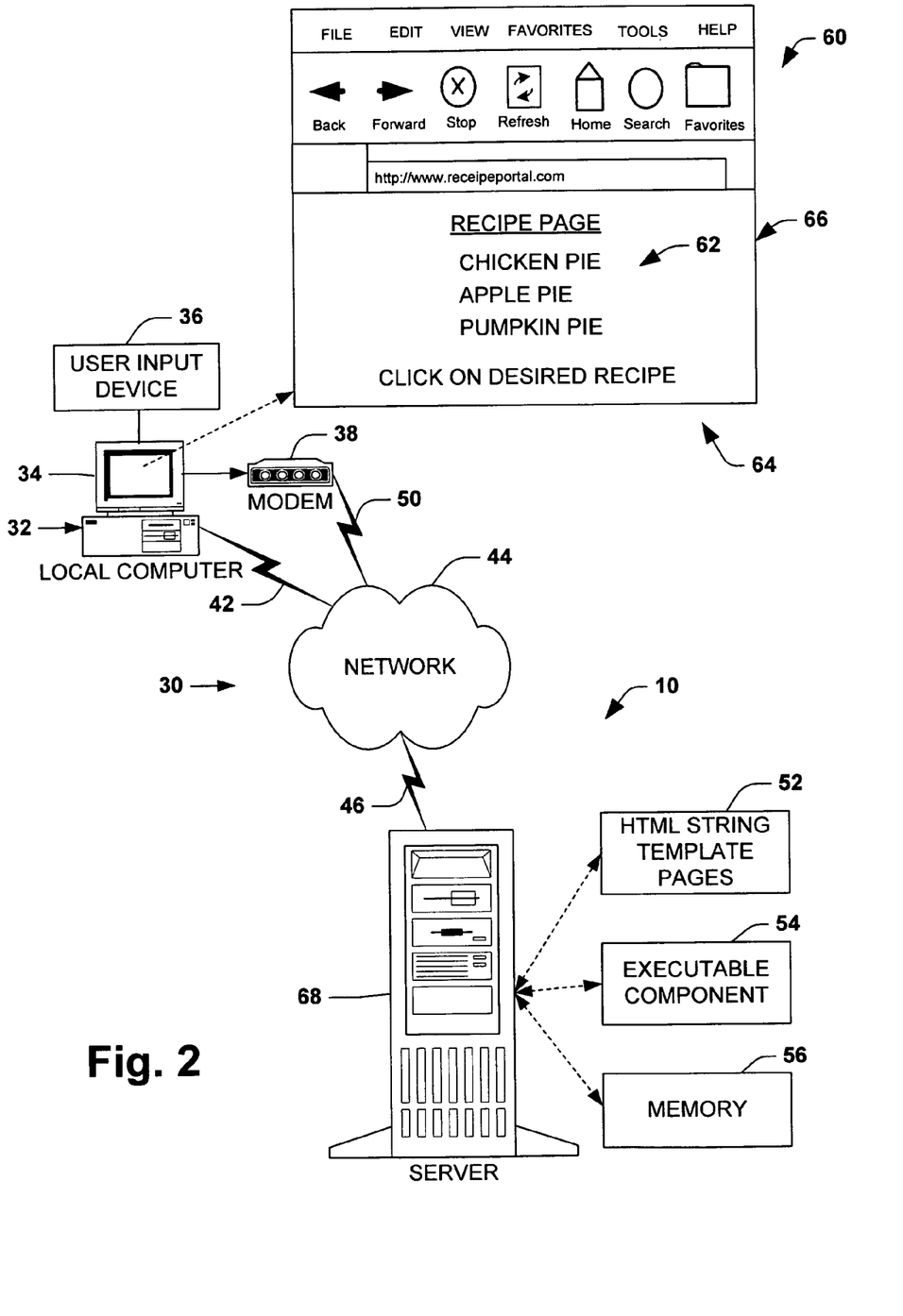
FIG. 2 illustrates a possible environment of the server system in accordance with one aspect of the invention.

An example of a possible environment 30 for the system 10 is illustrated in FIG. 2. The environment 30 includes a local computer 32 having a display 34 and a user input device 36 through which an individual may interact with the local computer 32. The user input device 36, for example, may include a keyboard, a pointer device (e.g., a mouse), a voice activated control device, a wireless input device, and/or other equipment or peripherals through which a user may interact with programs running on the local computer 32.

The local computer 32 is operatively coupled to a network 44, such as an Internet, an intranet, or another computer network. The local computer 32 is connected to the network 44, for example, over a telephone line 50 via a modem 38. Alternatively, the local computer 32 may be connected to the network 44 through another connection 42, such as an integrated services digital network (ISDN), T1, DS 1 or other high speed telecommunications connections and an appropriate connection device, a television cable and modem, a satellite link, an optical fiber link, an Ethernet or other local area network technology wire and adapter card, radio or optical transmission devices, etc. It is to be appreciated that the invention also may be implemented in a browser environment for other public and private computer networks, such as a computer network of a commercial on-line service or an internal corporate local area network (LAN), an Intranet, or like computer network.

The local computer 32 runs software, including a browser 60, for unified browsing of electronic documents and other data from local sources as well as from the computer network 44. Specifically, documents for browsing with the browser software may reside as files of a file system stored in appropriate storage devices at the local computer 32 or reside at resources at a remote computer 68. The remote computer 68 is operatively coupled to the network 44 via connection 46, which may be in the form of a telecommunications connection and appropriate device or any other communications link (including wired and wireless) to the network. By way of example, the remote computer 68 is an Internet-based server connected to the computer network 44 to provide one or more World Wide Web ("Web") sites to which the local computer 32 may connect.

By way of example, a plurality of HTML string template pages 52 resides at the remote computer 68 that conforms to HTML standards. It is to be appreciated that the browser software running at the local computer 32 may be capable of browsing documents having other data formats from the local computer or the remote computer 32. The HTML string template pages 52 include text constants that are logically grouped into pages and strings. A string is the largest text constant which will be used in total and with a pre-defined, constant number of variable parts, and a page is the collection of all the strings needed to complete one request. Editing the file can be done with a document editing tool, and likewise viewing the file can be done in the typical manner as well, as long as meta-information in the page is included in a format that is considered hidden by the viewer.

The browser software running locally on the local computer 32 displays a HTML document 62 in a window 64 or area of the local computer's display 34 allocated to the browser by the operating system. The window 64 includes a document display area 66 and user interface controls (not shown). The browser displays the HTML document 62 within the document display area 66 of the window 64, although other display types also may be used. The displayed document may include text and/or images generated by an executable component 54 in conjunction with the HTML string template pages 52.

In the example shown in FIG. 2, the display area 66 includes a display of a recipe portal web page. The recipe portal web page includes three selectable recipes labeled chicken pie, apple pie and pumpkin pie. A user may click on one of the recipes employing the user input device 36 to view a desired recipe. The selection of a desired recipe causes a request to be sent over the network 44 to the executable component 54 residing on the remote computer 68. The executable component 54 will execute any code necessary to responding to the request. The executable component 54 will then acquire the desired string constants from a memory 56 and insert the variable arguments (e.g., the selected recipe) into the string constants. The executable component 54 can then transmit the desired HTML page and appropriate code responses to the local computer 32 for display at the browser 60.

Figure 3:
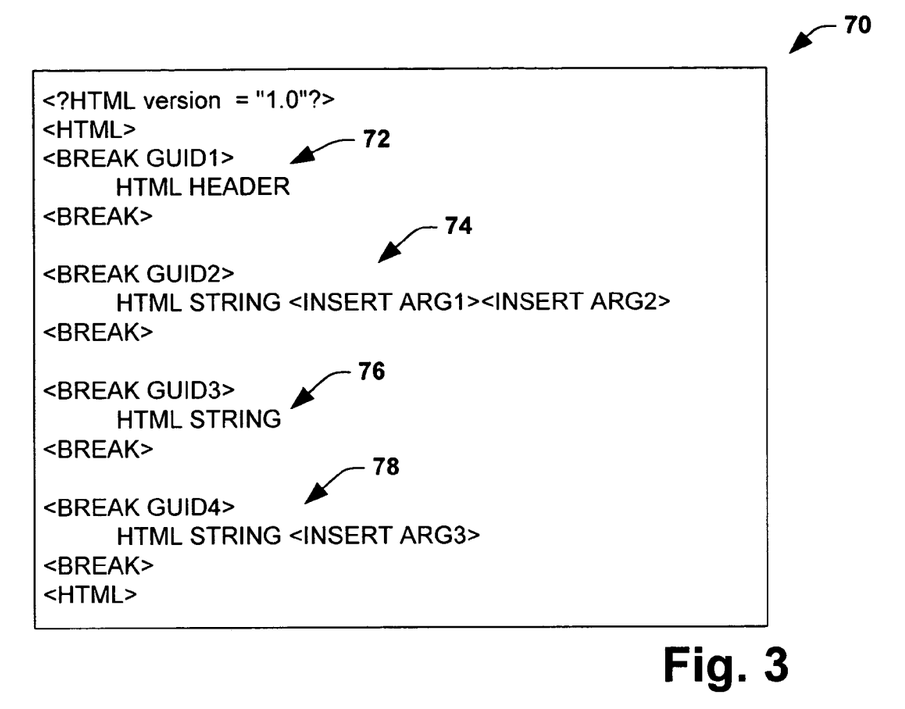
FIG. 3 illustrates an example of a string template page in accordance with one aspect of the present invention.

FIG. 3 illustrates an example of a string template page 70. The string template page 70 includes four strings and three variable arguments within the strings. A first string 72 includes a meta-tag labeled "BREAK" with a unique identifier name labeled "GUID1". The first string 72 is the header string. A second string 74 includes another meta-tag labeled "BREAK" with a unique identifier name labeled "GUID2". The second string 74 also includes two meta-tags labeled "INSERT" with corresponding argument numbers "ARG1" and "ARG2" within the HTML string. A third string 76 includes a meta-tag labeled "BREAK" with a unique identifier name labeled "GUID3". A fourth string 78 includes another meta-tag labeled "BREAK" with a unique identifier name labeled "GUID4". The fourth string 78 also includes a meta-tag labeled "INSERT" with an argument numbers "ARG3" within the HTML text of the string 78. The "INSERT" meta-tags define the beginning and end location of each string and the "INSERT" meta-tags define the location for inserting the different arguments by number. The executable component 54 can employ the "BREAK" and "INSERT" meta-tags to load the text constant information of the page 70 into memory 56 for use at runtime.

In one aspect of the invention, the executable component employs intelligent IDs. An intelligent ID is a globally scoped structure that contains two fields, the constant unique identifier and a pointer to the actual information (object). The executable code only needs to reference the intelligent ID when referring to an object. When the executable component starts up, every intelligent ID's pointer field is initially NULL. If an intelligent ID is referenced which still has a NULL pointer field, a search is made for the object referred to by the unique identifier field. When the object is found, the pointer to that object is stored in the intelligent ID. In all future references to the intelligent ID, the pointer field is found to be not NULL, and that pointer is used directly.

Figure 4:
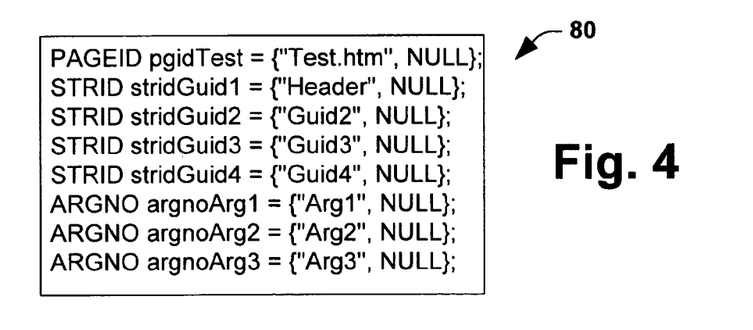
FIG. 4 illustrates an example of employing intelligent IDs using data structures prior to referencing of the ID in accordance with one aspect of the present invention.
Figure 5:
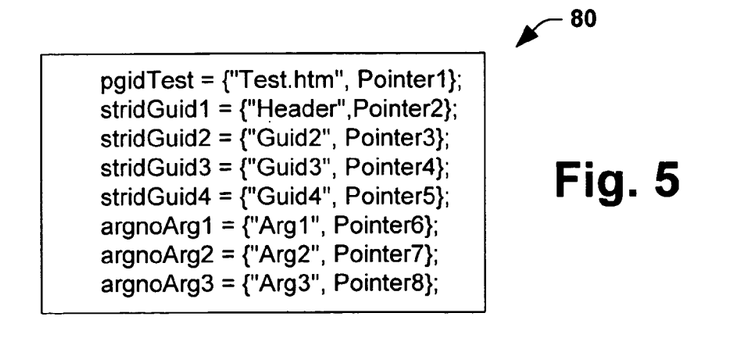
FIG. 5 illustrates an example of employing intelligent IDs using data structures after referencing of the ID in accordance with one aspect of the present invention.

FIGS. 4 and 5 illustrate an example of employing intelligent IDs in code of the executable component referencing the string template page 70 illustrated in FIG. 3. A data structure portion 80 includes a page data structure for the string template page 70 with a corresponding page ID. The page data structure includes a page name or ID and a pointer to the location of the page in memory. A plurality of string data structures are provided for the string template page 70, which includes a first named "HEADER" and three remaining strings named "GUID2", "GUID3" and "GUID4". Each string data structure includes a pointer to the corresponding string in memory. Additionally, a list of argument number data structures is provided for the string template page 70. The argument numbers are labeled ARG1, ARG2 and ARG3. Each argument data structure includes a pointer to the corresponding argument in memory. In the example of FIG. 4, none of the IDs of the page, strings and arguments have been referenced and all of the pointers are set to "NULL". FIG. 5 illustrates the data structure portion 80 once the IDs have been referenced. After all of the IDs of the page, strings and arguments have been referenced, then all of the pointers have a pointer value for the data structure portion 80. In all future references to the IDs of the page strings and arguments the corresponding pointer can be used directly. It is to be appreciated that although in the present example, a single list of arguments for the string template page 70 is illustrated for simplicity purposes, a list of arguments may be provided for each string in the string template page 70.

Figure 6:
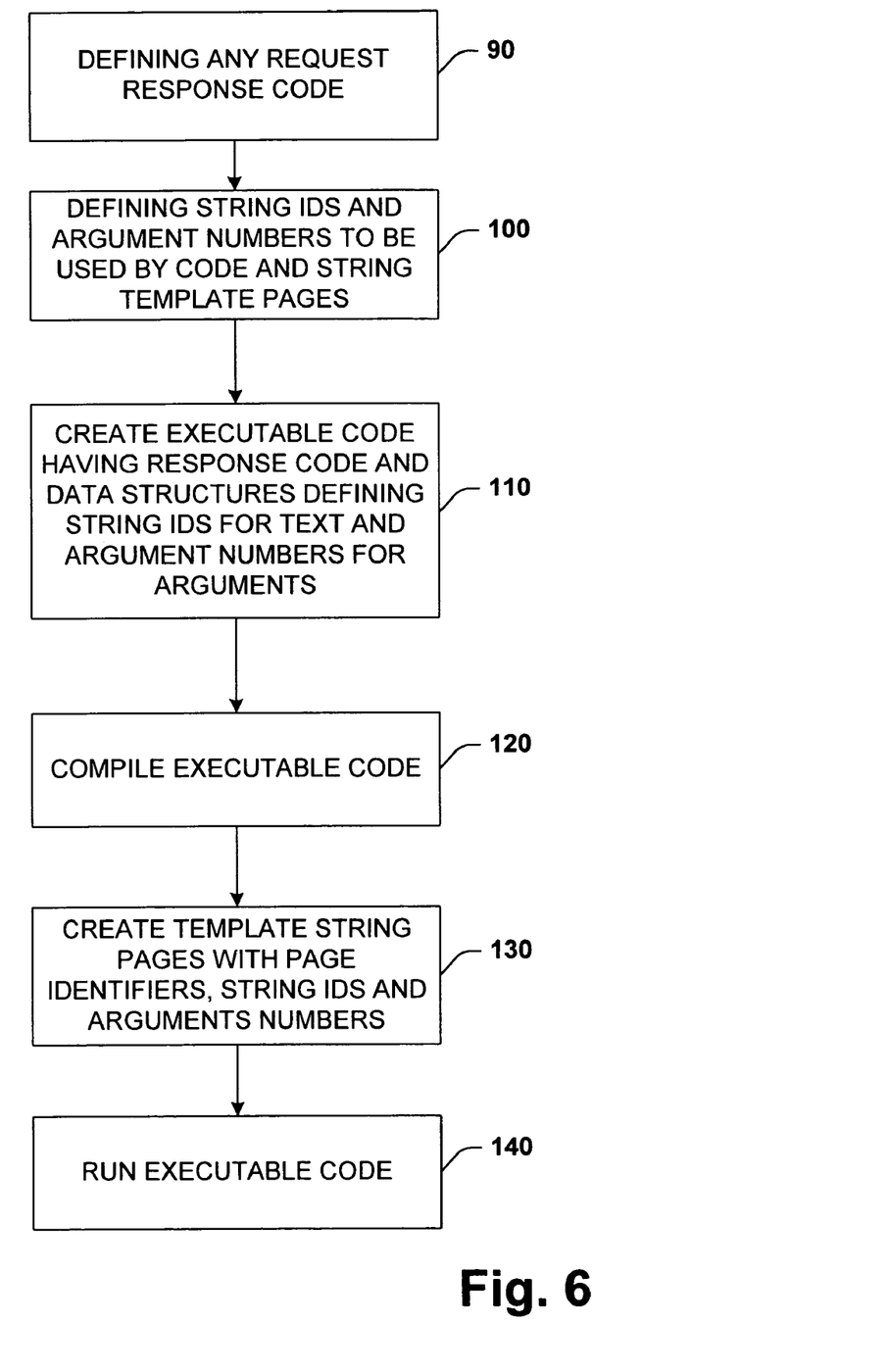
FIG. 6 illustrates a flow diagram of one particular methodology for providing a server system in accordance with one aspect of the present invention.
Figure 7:
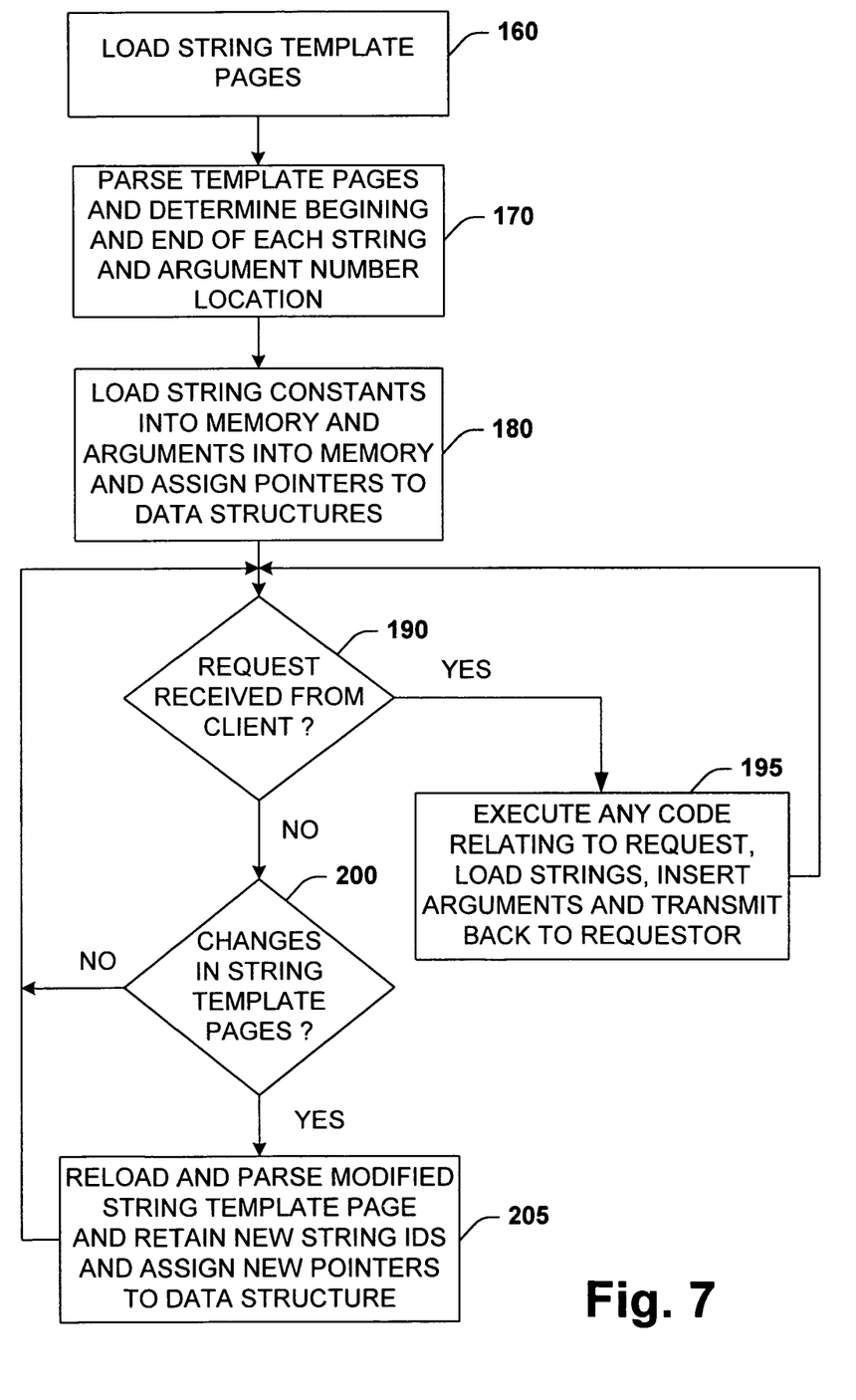
FIG. 7 illustrates a flow diagram of one particular methodology for operation of an executable component in accordance with one aspect of the present invention.

In view of the structure described above with respect to FIGS. 1–5, a methodology for providing the particular aspects of the invention may be better appreciated with respect to the flow diagrams of FIGS. 6–7. While, for purposes of simplicity of explanation, the methodologies of FIGS. 6–7 are shown and described as a series of steps, it is to be understood and appreciated that the present invention is not limited to the order of steps, as some steps may, in accordance with the present invention, occur in different orders and/or concurrently with other steps from that shown and described herein. Moreover, not all illustrated steps may be required to implement a methodology in accordance with an aspect the present invention.

FIG. 6 illustrates a methodology for providing a system for supply requested HTML pages in accordance with one aspect of the present invention. At step 90, any necessary request response code is defined. The string IDs and argument numbers to be used by the code and string template pages are defined at step 100. At step 110, the code is created using C, C++ or the like employing the necessary response code to any request and defining the data structures. Defining the data structures comprises defining the page IDs, string IDs for text constants and argument locations for the string variables. The executable code is then compiled, by for example, a C, C++ or the like compiler at step 120 to provide a binary executable code. At step 130, the template string pages are created with page identifiers, string IDs for each string and argument numbers for variables to be inserted into the strings. At step 140, the compiled binary executable code is invoked.

FIG. 7 illustrates a methodology for the operation of the compiled binary executable code. At step 160, the compiled binary executable code loads the string template pages up into temporary memory or the like. The executable code then parses the string template pages and determines the beginning and end of each string and the argument location within each sting at step 170. At step 180, the executable code stores the string constants and argument numbers and retains the location of the string constants and argument numbers in memory, for example, by assigning pointers to data structures containing the string ID or argument number. The data structures include a string ID and pointer or an argument number and pointer. At step 190, the executable code determines if a request has been received from a client. If a request has been received from a client (YES), the executable component proceeds to step 195. At step 195, the executable component executes any code relating to the request, loads the strings (e.g., into an HTML page), inserts the arguments into the strings and transmits the requested information back to the requestor. The executable component then returns to step 190. If a request has not been received from a client (NO) at step 190, the executable component determines if any changes have occurred in any of the string template pages at step 200. If a change has occurred in any of the string template pages (YES), the executable component reloads and parses the modified string template pages and retains the new string IDs and assigns new pointers to the data structure. The executable component then returns to step 190. If a change has not occurred in any of the string template pages (NO), the executable component returns to step 190.

Figure 8:
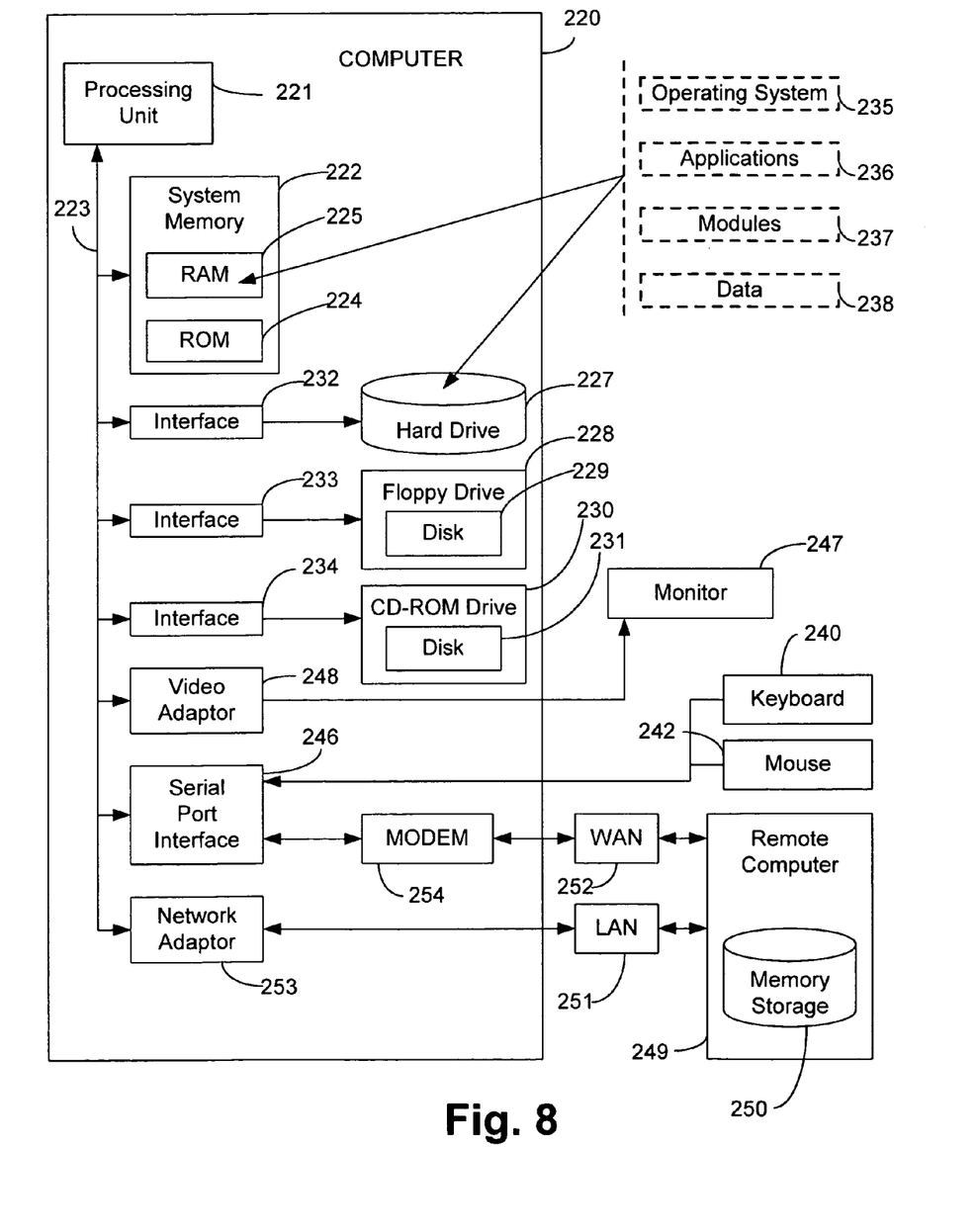
FIG. 8 illustrates a block diagram of a computer system in accordance with an environment of the present invention.

With reference to FIG. 8, an exemplary system for implementing the invention includes a conventional personal or server computer 220, including a processing unit 221, a system memory 222, and a system bus 223 that couples various system components including the system memory to the processing unit 221. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the server computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 225, including an operating system 235, one or more application programs 236, other program modules 237, and program data 238. The operating system 235 in the illustrated computer can be Microsoft Windows NT Server operating system, together with the before mentioned Microsoft Transaction Server, Microsoft Windows 95, Microsoft Windows 98 or Microsoft Windows 2000.

A user may enter commands and information into the computer 220 through a keyboard 240 and pointing device, such as a mouse 242. Other input devices (not shown) may include a microphone, joystick, game pad, satellite dish, scanner, or the like. These and other input devices are often connected to the processing unit 221 through a serial port interface 246 that is coupled to the system bus, but may be connected by other interfaces, such as a parallel port, game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote server or client computer 249. The remote computer 249 may be a workstation, a server computer, a router, a peer device or other common network node, and typically includes many or all of the elements described relative to the computer 220, although only a memory storage device 250 has been illustrated in FIG. 8. The logical connections depicted in FIG. 8 include a local area network (LAN) 251 and a wide area network (WAN) 252. Such networking environments are commonplace in offices, enterprise-wide computer networks, intranets and the Internet.

When used in a LAN networking environment, the computer 220 is connected to the local network 251 through a network interface or adapter 253. When used in a WAN networking environment, the server computer 220 typically includes a modem 254, or is connected to a communications server on the LAN, or has other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 220, unless indicated otherwise. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and a particular example, however, it is to be appreciated that various programming methodology and/or computer architecture suitable for carrying out the present invention may be employed and are intended to fall within the scope of the hereto appended claims.

The invention has been described with reference to the preferred aspects of the invention. Obviously, modifications and alterations will occur to others upon reading and understanding the foregone detailed description. It is intended that the invention be construed as including all such modifications alterations, and equivalents thereof.

What is claimed is:

1. A computer implemented system for servicing a client request comprising:
   at least one string template page having at least one text constant; and
   an executable component operable for receiving the request and executing code corresponding to the request, the executable component retrieving the at least one text constant and inserting at least one variable argument result corresponding to the request into the at least one text constant and passing the at least one text constant and variable argument result to the client; and
   a monitoring system for informing the executable component of any changes occurring in the at least one string template page, the executable component being adapted to reload, parse and store the changed at least one string template page upon being informed of any changes by the monitoring system.

2. The system of claim 1, wherein the at least one text constant and the variable argument result reside in a memory location accessible by the executable component.

3. The system of claim 1, wherein the at least one text constant and the variable argument result are loaded into memory prior to runtime.

4. The system of claim 1, the at least one string template page having at least one argument associated therewith.

5. The system of claim 1, the at least one text constant having at least one argument associated therewith.

6. The system of claim 5, the at least one text constant employing a new string indicator to identify each of the at least one text constant and a new argument indicator to identify each of the at least one argument.

7. The system of claim 1, the executable component loading the at least one string template page and parsing the at least one string template page to identify the at least one text constant, the executable component storing the at least one text constant into memory and retaining a unique identifier of the at least one text constant for retrieving the at least one text constant from memory at runtime.

8. The system of claim 7, the executable component also retaining a pointer to the memory location of the at least one text constant for retrieving the at least one text constant from memory at runtime.

9. The system of claim 7, the executable component parsing the at least one text constant to identify at least one argument associated with the at least one text constant, the executable component retaining a unique identifier number for the at least one argument for retrieving the at least one variable argument result at runtime.

10. The system of claim 9, the executable component also retaining a pointer to a location of the at least one argument within the at least one text constant for determining the location for inserting the at least one variable argument result into the at least one text constant at runtime.

11. The system of claim 1, the monitoring system being a configuration data source.

12. The system of claim 1, the executable component employing at least one intelligent ID to retrieve the at least one text constant from memory.

13. The system of claim 1, the at least one text constant being an HTML text constant.

14. A computer readable medium having computer-executable components comprising;
- a first component operable for receiving a request from a client and executing code corresponding to the request, the first component retrieving at least one text constant residing in a memory corresponding to the request and passing the at least one text constant to the client; and
- a second component adapted to monitor any changes in at least one string template page and inform the first component of any changes in the at least one string template page, the first component being adapted to reload, parse and store the changed at least one string template upon being informed of any changes by second component.

15. The computer readable medium of claim 14, the first component being further operable to retrieve at least one variable argument result from the memory and insert the at least one variable argument result into the at least one text constant.

16. The computer readable medium of claim 14, the first component being further operable to parse the at least one string template page for the at least one text constant and store the at least one text constant in the memory.

* * * * *